Oct. 30, 1928.

W. A. ROSS 1,689,455

DRILLING APPARATUS

Original Filed Feb. 11, 1927   3 Sheets-Sheet 1

Inventor
Warren A. Ross
by Parker & Carter
Attorneys.

Oct. 30, 1928.
W. A. ROSS
1,689,455
DRILLING APPARATUS
Original Filed Feb. 11, 1927    3 Sheets-Sheet 2
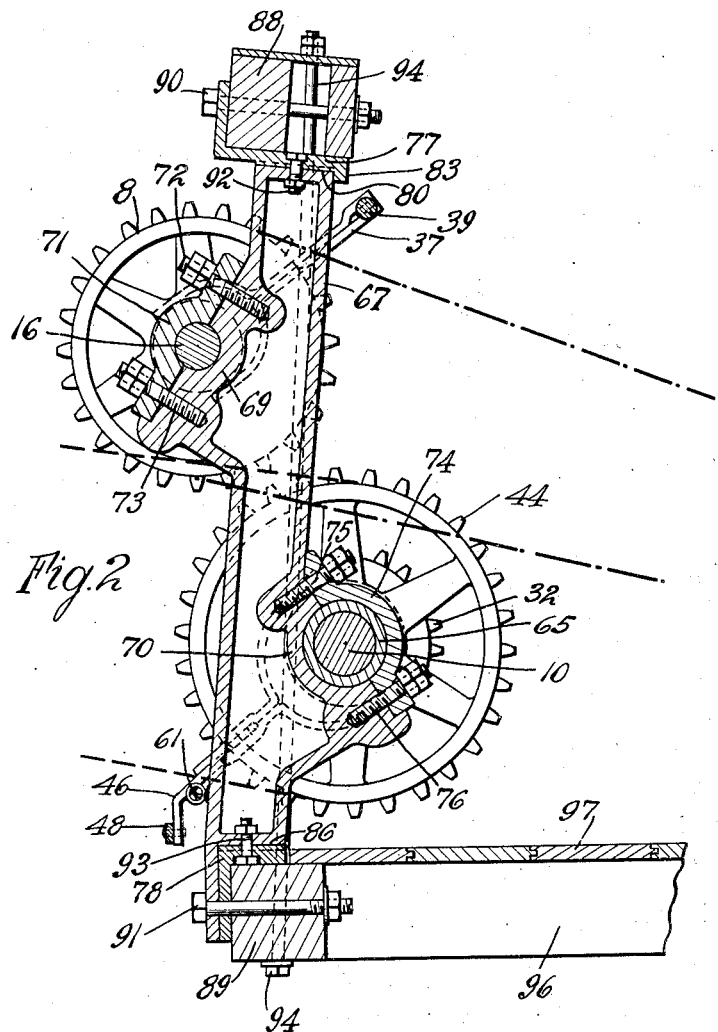
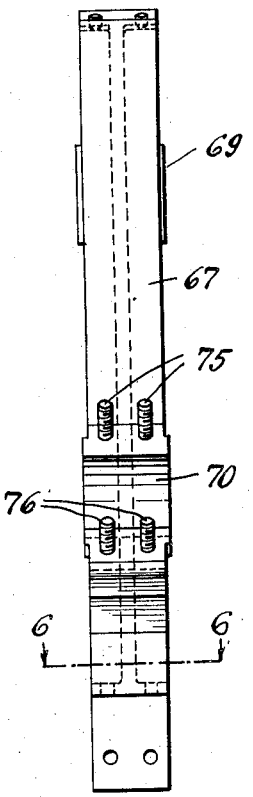
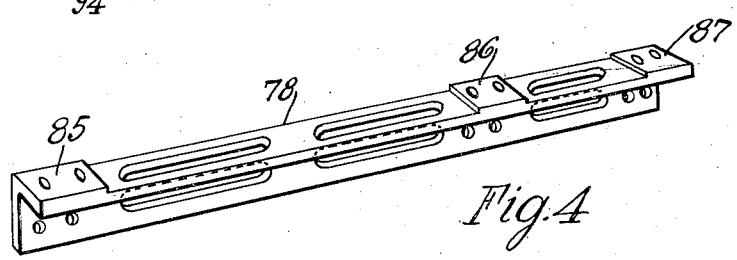
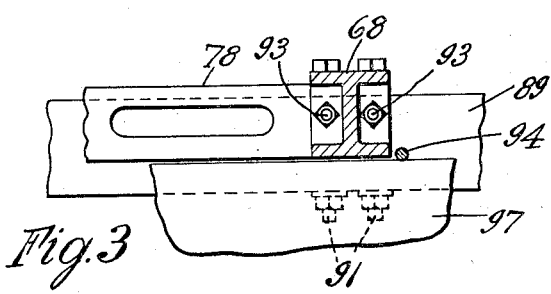
Inventor
Warren A. Ross
by Parker & Carter
Attorneys.

Oct. 30, 1928.  
W. A. ROSS  
1,689,455  
DRILLING APPARATUS  
Original Filed Feb. 11, 1927    3 Sheets-Sheet 3
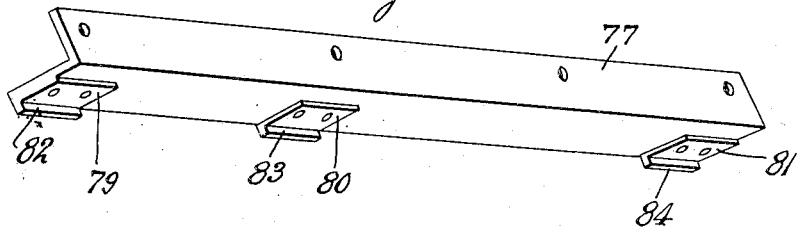
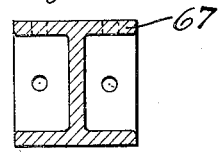
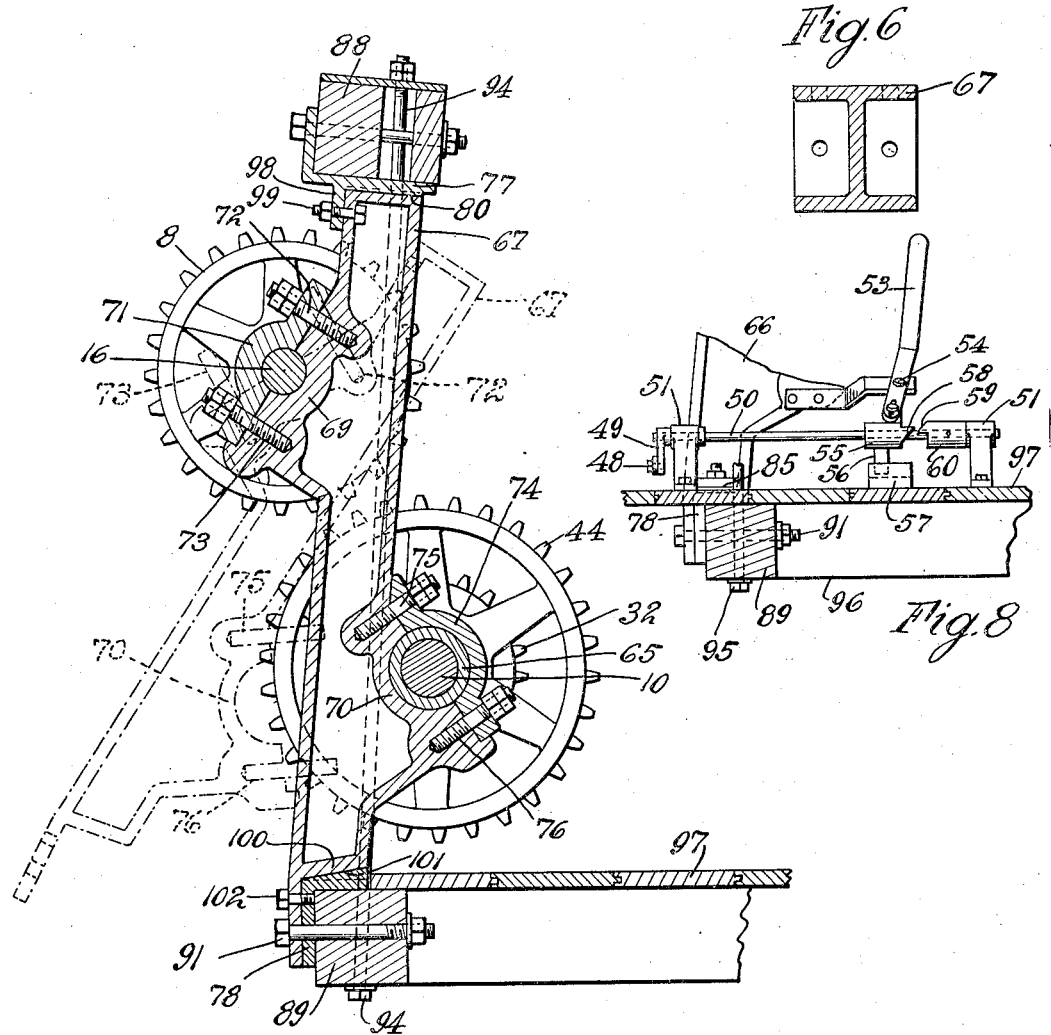
Inventor  
Warren A. Ross  
by Parker & Carter  
Attorneys.

Patented Oct. 30, 1928.

1,689,455

UNITED STATES PATENT OFFICE.

WARREN A. ROSS, OF LONG BEACH, CALIFORNIA, ASSIGNOR OF ONE-FOURTH TO DONALD M. CARTER, OF CHICAGO, ILLINOIS, AND ONE-FOURTH TO TRUMAN O. BOYD, OF LONG BEACH, CALIFORNIA.

DRILLING APPARATUS.

Original application filed February 11, 1927, Serial No. 167,567. Divided and this application filed August 8, 1927. Serial No. 211,372.

This invention relates to drilling apparatus and has for its object to provide a new and improved apparatus of this description.

The invention has as a further object to provide a new and improved construction for supporting the shafts and the operative connections between such shafts and the other part of the apparatus.

The invention has as a further object to provide a construction which can be accurately made in the shop so that it can be accurately assembled on the work.

The invention has as a further object to provide a construction which may be assembled on the work and which will insure the proper alignment of the shafts.

The invention has other objects which are more particularly pointed out in the accompanying description.

This application is a division of my application 167,567, filed February 11, 1927.

Referring now to the drawings, Fig. 1 is a front elevation showing the shafts and shaft supporting frame and associated parts.

Fig. 2 is a sectional view taken on line 2—2 of Fig. 1.

Fig. 3 is a sectional view taken on line 3—3 of Fig. 1.

Fig. 4 is a perspective view of one of the frame pieces of the frame shown in Fig. 1.

Fig. 5 is a view of one of the bearing supporting members of the frame shown in Fig. 1.

Fig. 6 is an enlarged sectional view taken on line 6—6 of Fig. 5.

Fig. 7 is a perspective view of one of the horizontal frame members of the frame shown in Fig. 1.

Fig. 8 is a view on line 8—8 of Fig. 1.

Fig. 9 is a view similar to Fig. 2 of a modification showing the attachment of the parts so that any one of the bearing supports can be easily removed.

Like numerals refer to like parts throughout the several figures.

Figure 1:
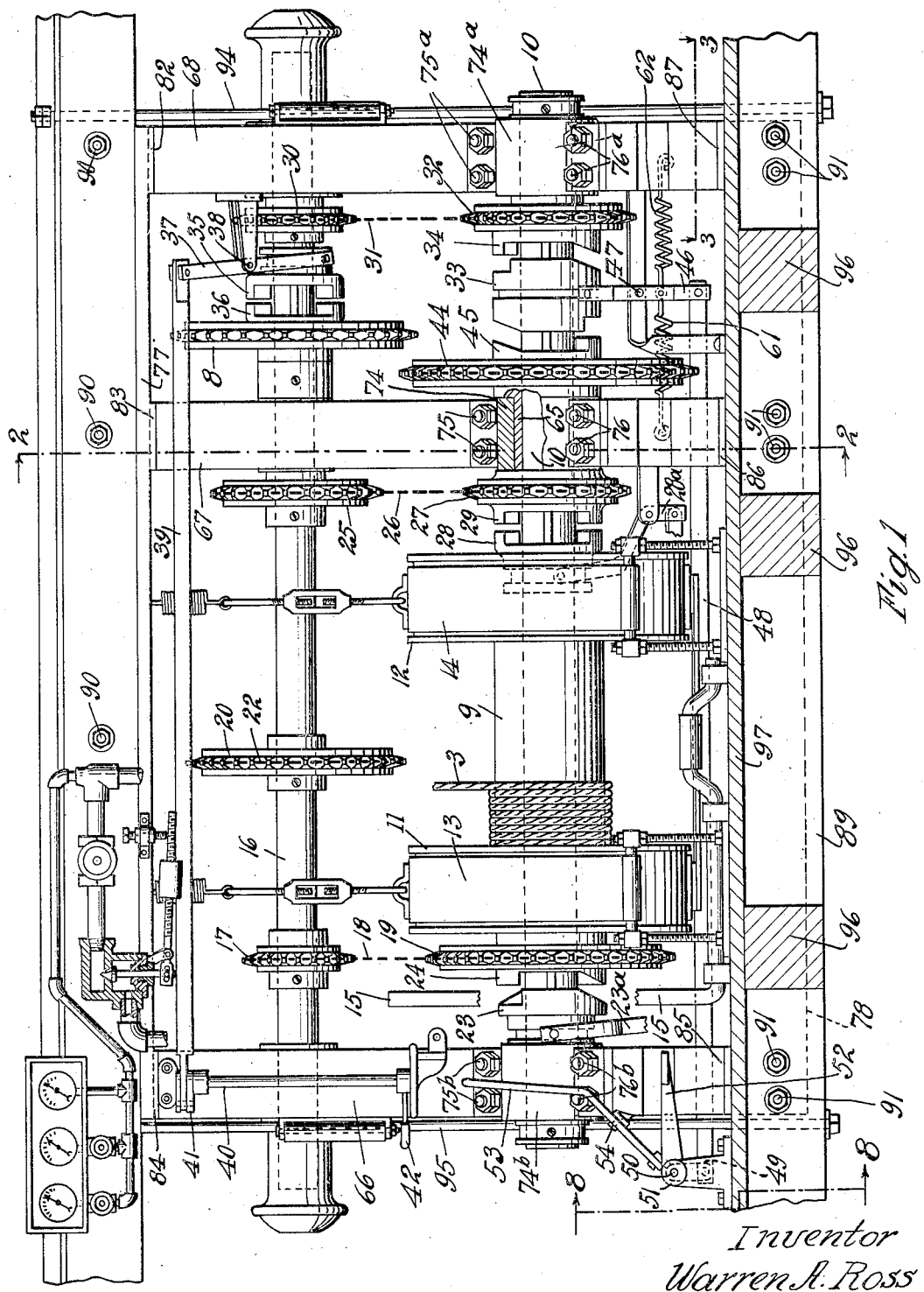

The cable 3, which is connected with the drill pipe, is wound upon a drum 9 keyed to the shaft 10, (see Fig. 1). This drum is provided with the brake wheels 11 and 12 and the brake bands 13, 14 controlled by the lever 15.

The drum is driven from the shaft 16 by means of a sprocket 17, belt 18 and sprocket 19 on the shaft 10. The shaft 16 is driven by belt 22 and the sprocket wheel 20.

The drum is driven at low speed through clutch members 23, 24 controlled by lever 23$^a$, sprocket wheels 17, 19 and belt 18 and at high speed by means of the sprocket wheel 25, belt 26, sprocket 27, and clutch members 29, 28, the latter being controlled by lever 28$^a$.

The drum is driven at an intermediate speed by sprocket wheel 30, belt 31 and sprocket wheel 32, the latter being connected to the shaft by clutch members 34 and 33. The drill pipe is rotated by means of sprocket wheel 8 connected to the shaft 16 by clutch members 36, 35, the latter being moved by lever 37, pivoted at 38, and connected by crank 41 to shaft 40 operated by handle 42.

A sprocket wheel 44 is connected to shaft 10 by clutch members 33, 45. Clutch member 33 is actuated by lever 46 pivoted at 47 and connected to piece 48 which is connected with crank 49 on shaft 50 carrying hub 51 of foot lever 52. Member 33 is moved to engage member 45 by hand lever 53 pivoted at 54 and connected with a sleeve 55 having a projection 56 working in a guide 57. Sleeve 55 has a beveled face 58 adapted to engage beveled face 59 on member 60 rotating with shaft 50.

The clutch member 33, when released, is centrally located by means of springs 61, 62.

In order that the frame supporting the shafts 10 and 11 shall not be unduly extended because of the numerous sprocket wheels associated therewith, and particularly with the shaft 10, I arrange the sprocket wheel 44 with a hub 65 which projects into the bearing. This gives an extended hub for the sprocket wheel 44, without lengthening the frame. This extended hub is necessary to hold the sprocket wheel in its proper position when it is connected with the pump.

The shafts 16 and 10 are mounted in bearings in a frame which frame is usually assembled in the field at the point of use.

In the construction heretofore used, the frame has been made of wood and there has been great difficulty in getting the bearings in proper alignment so that the two shafts will be parallel as the tightening up of screws in wood tends to move the parts out of alignment.

The construction herein shown is arranged to remedy this evil. The bearings for the shafts are located on the upright members 66, 67, and 68 of the frame. These members are made of metal, preferably of an I beam cross section as shown in Fig. 6 so as to make them light but still strong and durable. Each member has two bearings preferably arranged on opposite sides thereof, as shown in Fig. 2. This figure shows the central member 67. Integral with the member 67 is a bearing element 69 for the shaft 16 and a bearing element 70 for the shaft 10. These bearing elements are, therefore, in fixed positions with relation to each other. The shaft 16 is held in place by a removable cap 71 which is held in position by screws 72 and 73. The shaft 10 is held in place by a removable cap 74 held in position by screws 75 and 76. Since these screws work in threaded holes in the metal, there can be no drawing of the parts out of alignment when they are tightened.

The other members 66 and 68 are similarly constructed and have similar bearing elements. The parts thereof which show in Fig. 1 have applied thereto, similar reference numerals with the exponents "a" and "b." Some means is provided for properly aligning the several bearings on the several members 66, 67 and 68, so that when the parts are assembled in the field, these bearings will always be in proper position. As herein shown, this is accomplished by the top and bottom aligning members 77 and 78. The top aligning member 77 is shown separately in Fig. 7 and the bottom aligning member 78 is shown separately in Fig. 4. These members may have portions of the metal omitted in order to lighten the construction. These members are also preferably cast and extend along the top and bottom of the members 66, 67, and 68 and are provided with projections where they are engaged by the members 66, 67 and 68 which projections may be planed off in the shop so that the bearings on all of the members 66, 67, and 68 will be in proper alignment. As herein shown the aligning member 77 is provided with projections 79, 80 and 81 which may be finished or planed, as above set out. I prefer to provide the upper aligning member 77 with flanges 82, 83 and 84 which overlap the edges of the members 66, 67 and 68 as shown in Fig. 2. The bottom aligning member 78 is provided with the projections 85, 86 and 87 which are planed off to secure the proper alignment of the shafts. In assembling the parts, the aligning members 77 and 78 are connected with the top and bottom beams 88 and 89, by means of bolts 90, 91, the bolts 91 also passing through the members 66, 67, and 68. The aligning member 77 is connected with the members 66, 67, and 68 by the bolts 92 and the aligning member 78 is connected with the members 66, 67, and 68 by the bolts 93. The beams 88 and 89 are connected together by the rods 94 and 95. A floor for the operator is also provided by means of the beams 96, the floor 97 being supported upon said beams and the beams 89 as shown in Figs. 1 and 2.

In Fig. 9 I have shown the parts so that any one of the bearing supports can be easily removed while the others are in position. One way of accomplishing this result is to provide the top aligning member 77 with a projection 98 which overlaps its associated bearing member or post, the bearing member or post 68 being shown in Fig. 9. A removable fastening device 99 fastens the parts together.

The bottom aligning member 78 is provided with an inclined upper face 101 which is engaged by the portion 100 of the bearing member. The fastening device 93 shown in Fig. 2 is omitted and a removable fastening device 102 at the side used. The bolt 91 may be the same as in Fig. 2.

It will be seen that when the fastening devices 99, 102 and 91 and the cap 74 are removed, the bearing member may be rotated or rocked about the shaft 16 as shown in dotted lines in Fig. 9. It may then be removed by removing the cap 71. It will thus be seen that each of the posts or bearing supports may be separately and independently removed.

It will be seen that by means of this construction the parts may be completely aligned and that when set up in the field complete alignment of the bearings of the shafts is assured. It will further be seen that the perfect alignment of the bearings of the shafts will not be affected in any way by the number of times the device is taken down and set up. This construction, therefore, provides a strong, and durable draw works which can be easily taken down and moved from place to place and easily and quickly assembled at the point of use requiring no skilled mechanics to secure and maintain the proper alignment of the bearings.

I claim:—

1. A draw works comprising a shaft, a plurality of metal bearing supporting members provided with bearings for the shaft, top and bottom members connecting the bearing supporting members and aligning members separate from the bearing-supporting members and removably connected therewith and with said top and bottom members.

2. A draw works comprising a shaft, a frame therefor having top and bottom members and connecting metal bearing supporting members, said metal bearing supporting members each having a bearing element connected therewith, and a metal aligning member interposed between the lower ends of said metal bearing supporting members and said bottom member and engaging therewith.

3. A draw works comprising a shaft, a frame therefor having top and bottom members and separate connecting metal bearing supporting members, said metal bearing supporting members each having a bearing element connected therewith, and metal aligning members connected with said top and bottom members and engaging the bearing supporting members, each bearing-supporting member having an inclined engaging face at one end, which engages a similarly inclined engaging face on the opposed aligned device.

4. A draw works comprising a shaft, a frame therefor having top and bottom members and connecting metal bearing supporting members, said metal bearing supporting members each having a bearing element integral therewith, and metal aligning members connected with said top and bottom members, one of said aligning members being provided with projections opposite the ends of the said bearing-supporting members, which are finished to secure the proper alignment of the shafts and which engage the ends of said bearing supporting members.

5. A draw works comprising two shafts, a frame therefor having top and bottom members and connecting metal bearing supporting members, said metal bearing supporting members each having two bearing members integral therewith at different points therealong and metal aligning members separate from said bearing-supporting members, removable fastening devices for fastening the bearing-supporting members and the aligning devices together, and engaging parts on the aligning devices for engaging opposite sides of the top and bottom of one of said bearing-supporting members, whereby when said fastening devices are disconnected said bearing-supporting member may be rocked about one of said shafts.

Signed at Chicago, county of Cook and State of Illinois, this 20th day of July, 1927.

WARREN A. ROSS.